US008678936B2

(12) United States Patent
Lesley et al.

(10) Patent No.: US 8,678,936 B2
(45) Date of Patent: Mar. 25, 2014

(54) GAMING MACHINE CHAIR AND WAGERING GAME SYSTEMS AND MACHINES WITH A GAMING CHAIR

(75) Inventors: Paul M. Lesley, Blue Island, IL (US); Robert Glenn, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 515 days.

(21) Appl. No.: 12/944,880

(22) Filed: Nov. 12, 2010

(65) Prior Publication Data

US 2011/0111847 A1 May 12, 2011

Related U.S. Application Data

(60) Provisional application No. 61/260,669, filed on Nov. 12, 2009.

(51) Int. Cl.
*A47C 7/72* (2006.01)
*H04R 5/02* (2006.01)
*A63F 13/02* (2006.01)
*A47C 1/12* (2006.01)

(52) U.S. Cl.
CPC *A47C 7/72* (2013.01); *H04R 5/023* (2013.01); *A63F 13/02* (2013.01); *A63F 2300/1043* (2013.01); *A47C 1/12* (2013.01)
USPC .............. 463/46; 463/13; 463/16; 463/47; 273/148 B; 297/217.1; 297/217.4; 297/217.6; 381/301; 381/333

(58) Field of Classification Search
CPC .............. A47C 1/00; A47C 1/12; A47C 7/72; A63F 13/02; A63F 13/23; A63F 13/1043; H04R 5/023
USPC .......... 273/148 B; 463/13, 16, 46, 47; 297/68, 297/217.1, 217.4, 217.6; 381/301, 333
See application file for complete search history.

(56) References Cited

U.S. PATENT DOCUMENTS

| | | | | | |
|---|---|---|---|---|---|
| 3,384,719 | A | * | 5/1968 | Lanzara | 381/301 |
| 3,512,605 | A | * | 5/1970 | McCorkle | 381/301 |
| 3,628,829 | A | | 12/1971 | Heilig | |
| 3,944,020 | A | * | 3/1976 | Brown | 381/301 |
| 4,027,112 | A | * | 5/1977 | Heppner et al. | 381/182 |
| 4,354,067 | A | * | 10/1982 | Yamada et al. | 381/413 |
| 4,705,274 | A | | 11/1987 | Yamada et al. | |

(Continued)

FOREIGN PATENT DOCUMENTS

| | | |
|---|---|---|
| WO | WO 2007/143849 | 12/2007 |
| WO | WO 2008/049217 | 5/2008 |

*Primary Examiner* — Gene Kim
*Assistant Examiner* — Alexander Niconovich
(74) *Attorney, Agent, or Firm* — Nixon Peabody LLP

(57) ABSTRACT

Gaming machine chairs and wagering game systems and machines with a gaming chair are presented herein. A gaming chair is disclosed that includes a base, a seat portion supported by the base, one or more speaker assemblies, and a backrest assembly. The backrest assembly includes a backrest and a mounting frame. The mounting frame has a polymeric honeycombed body comprising a plurality of ribs that define an array of compartments. Optionally, the mounting frame body has at least one contoured face. The mounting frame is attached to the backrest and speaker assembly, coupling both the backrest and speaker assembly to the base. The mounting frame may be fabricated with numerous fastening regions that are integrally formed with the polymeric body. In this optional configuration, at least some of the fastening regions lie in a respective plane divergent from the other fastening regions.

27 Claims, 8 Drawing Sheets

(56) References Cited

U.S. PATENT DOCUMENTS

| | | | |
|---|---|---|---|
| 4,710,129 A * | 12/1987 | Newman et al. | 434/55 |
| 4,826,245 A * | 5/1989 | Entratter | 297/217.5 |
| 4,856,771 A | 8/1989 | Nelson et al. | |
| 5,022,708 A | 6/1991 | Nordella et al. | |
| 5,133,017 A | 7/1992 | Cain et al. | |
| 5,143,055 A | 9/1992 | Eakin | |
| 5,195,746 A | 3/1993 | Boyd et al. | |
| 5,259,613 A | 11/1993 | Marnell | |
| 5,326,104 A | 7/1994 | Pease et al. | |
| 5,490,784 A | 2/1996 | Carmein | |
| 5,496,220 A | 3/1996 | Engstrand | |
| 5,553,148 A | 9/1996 | Werle | |
| 5,573,320 A * | 11/1996 | Shearer | 312/223.3 |
| 5,605,462 A | 2/1997 | Denne | |
| 5,669,818 A | 9/1997 | Thorner et al. | |
| 5,678,886 A * | 10/1997 | Infanti | 297/217.3 |
| 5,762,617 A * | 6/1998 | Infanti | 601/49 |
| 5,807,177 A * | 9/1998 | Takemoto et al. | 463/47 |
| 5,838,808 A * | 11/1998 | Prosser | 381/388 |
| 5,857,986 A | 1/1999 | Moriyasu | |
| 5,901,612 A | 5/1999 | Letovsky | |
| 5,954,508 A | 9/1999 | Lo et al. | |
| 6,039,653 A | 3/2000 | Engstrand | |
| 6,075,868 A * | 6/2000 | Goldfarb et al. | 381/301 |
| 6,089,663 A * | 7/2000 | Hill | 297/258.1 |
| 6,102,476 A | 8/2000 | May et al. | |
| 6,139,324 A * | 10/2000 | Roy et al. | 434/55 |
| 6,145,926 A | 11/2000 | Lin | |
| 6,224,491 B1 * | 5/2001 | Hiromi et al. | 472/59 |
| 6,283,757 B1 | 9/2001 | Meghnot et al. | |
| 6,315,673 B1 | 11/2001 | Koper et al. | |
| 6,334,612 B1 | 1/2002 | Wurz et al. | |
| 6,347,999 B1 * | 2/2002 | Yuan | 463/46 |
| 6,354,044 B1 * | 3/2002 | Lagace, Jr. | 52/79.5 |
| 6,369,312 B1 | 4/2002 | Komatsu | |
| 6,371,853 B1 | 4/2002 | Borta | |
| 6,422,941 B1 | 7/2002 | Thorner et al. | |
| 6,505,804 B1 | 1/2003 | Francis et al. | |
| 6,530,842 B1 * | 3/2003 | Wells et al. | 463/46 |
| 6,585,515 B1 * | 7/2003 | Roy et al. | 434/55 |
| 6,638,169 B2 | 10/2003 | Wilder et al. | |
| 6,656,137 B1 | 12/2003 | Tyldsley et al. | |
| 6,659,773 B2 * | 12/2003 | Roy et al. | 434/55 |
| 6,662,560 B2 * | 12/2003 | Roy et al. | 60/545 |
| 6,702,767 B1 | 3/2004 | Douglas et al. | |
| 6,733,293 B2 | 5/2004 | Baker et al. | |
| 6,744,898 B1 * | 6/2004 | Hirano | 381/333 |
| 6,752,716 B1 | 6/2004 | Nishimura et al. | |
| 6,755,467 B1 * | 6/2004 | Chu | 297/284.1 |
| 6,793,495 B2 * | 9/2004 | Kang | 434/55 |
| 6,910,734 B2 | 6/2005 | Steelman | |
| 7,008,022 B2 * | 3/2006 | Cassaday | 297/463.1 |
| 7,031,384 B2 | 4/2006 | Kondo et al. | |
| 7,125,074 B2 * | 10/2006 | Real et al. | 297/217.3 |
| 7,163,263 B1 * | 1/2007 | Kurrasch et al. | 297/217.3 |
| 7,188,909 B2 * | 3/2007 | Cassaday | 297/463.1 |
| 7,273,251 B2 * | 9/2007 | Real et al. | 297/217.3 |
| 7,321,799 B2 | 1/2008 | Paillard | |
| 7,322,653 B2 * | 1/2008 | Dragusin | 297/300.3 |
| 7,328,900 B2 | 2/2008 | Mamitsu et al. | |
| 7,367,886 B2 * | 5/2008 | Loose et al. | 463/35 |
| 7,402,041 B2 | 7/2008 | Nelms et al. | |
| 7,625,288 B1 | 12/2009 | Steelman | |
| 7,688,992 B2 * | 3/2010 | Aylward et al. | 381/388 |
| 7,766,747 B2 * | 8/2010 | Bonney et al. | 463/35 |
| 7,794,014 B2 | 9/2010 | Beall et al. | |
| 7,823,973 B2 * | 11/2010 | Dragusin | 297/217.3 |
| 7,866,747 B2 * | 1/2011 | Park | 297/217.4 |
| 7,934,773 B2 | 5/2011 | Boulais et al. | |
| 8,000,484 B2 | 8/2011 | Rasmussen | 381/301 |
| 8,029,369 B2 * | 10/2011 | Hahn | 463/47 |
| 8,113,517 B2 * | 2/2012 | Canterbury et al. | 273/148 B |
| 8,199,940 B2 * | 6/2012 | Yokota | 381/301 |
| 8,262,478 B2 | 9/2012 | Pryzby | |
| 2004/0229192 A1 * | 11/2004 | Roy et al. | 434/29 |
| 2004/0254020 A1 * | 12/2004 | Dragusin | 463/46 |
| 2006/0014586 A1 * | 1/2006 | Gatto et al. | 463/46 |
| 2006/0199645 A1 * | 9/2006 | Canterbury et al. | 463/43 |
| 2006/0256234 A1 | 11/2006 | Roy et al. | |
| 2006/0256972 A1 | 11/2006 | Roy et al. | |
| 2007/0021218 A1 * | 1/2007 | Okada | 463/47 |
| 2007/0122793 A1 * | 5/2007 | Orban et al. | 434/365 |
| 2007/0123354 A1 * | 5/2007 | Okada | 463/47 |
| 2008/0039216 A1 * | 2/2008 | Higashiguchi | 463/47 |
| 2008/0054561 A1 * | 3/2008 | Canterbury et al. | 273/148 B |
| 2008/0100106 A1 * | 5/2008 | Dragusin | 297/217.3 |
| 2008/0109265 A1 * | 5/2008 | Roy et al. | 705/5 |
| 2008/0111408 A1 * | 5/2008 | Duran et al. | 297/217.4 |
| 2008/0211276 A1 * | 9/2008 | Rasmussen | 297/217.3 |
| 2009/0163283 A1 * | 6/2009 | Childress | 463/47 |
| 2011/0109134 A1 * | 5/2011 | Filipour et al. | 297/217.4 |

* cited by examiner

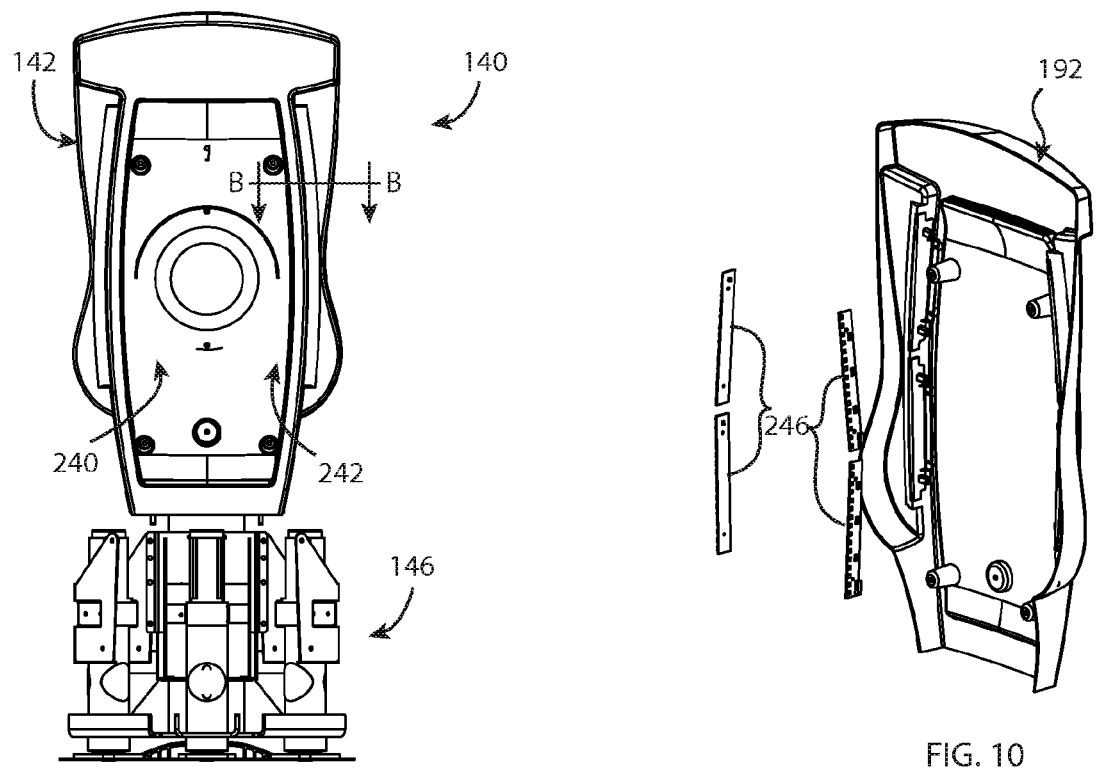
FIG. 9
FIG. 10
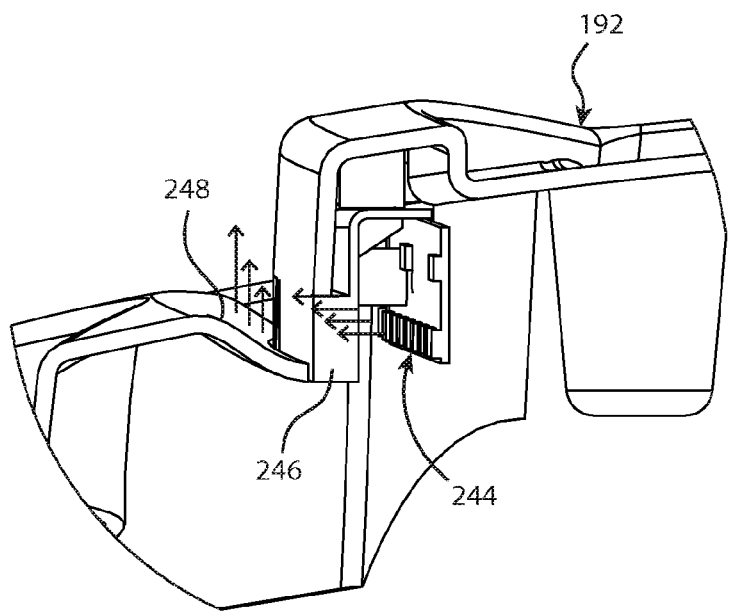
FIG. 11

GAMING MACHINE CHAIR AND WAGERING GAME SYSTEMS AND MACHINES WITH A GAMING CHAIR

CROSS-REFERENCE AND CLAIM OF PRIORITY TO RELATED APPLICATION

This application claims the benefit of and priority to U.S. Provisional Patent Application No. 61/260,669, filed Nov. 12, 2009, entitled "Gaming Machine Chair and Wagering Game Systems and Machines with a Gaming Chair" which is hereby incorporated by reference in it's entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to wagering game machines and gaming systems. More particularly, the present disclosure relates to gaming chairs, as well as wagering game machines and systems with a gaming chair.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine, as well as the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Consequently, shrewd operators strive to employ the most entertaining and exciting machines, features, and enhancements available because such machines attract frequent play and, hence, increase profitability to the operator.

Heretofore, gaming machine design and innovation has focused primarily on attraction devices, lighting, payout mechanisms, networking, and predominantly on game play, such as base game characteristics and enhancements, bonus rounds, and progressive-type game play. Gaming chairs have received less attention, with such attention being generally limited to improving player comfort and convenience. Even less attention has been paid to automating chair positioning and improving other tactile features.

While player comfort has been addressed to some extent, typically, it has been isolated to chair ergonomics and the incorporation of adjustable features (e.g. pivotable arm rests, stowable cup holders, etc.). For instance, players typically cannot sit back in the gaming chair and relax in comfort because the game play buttons are located on the gaming machine requiring most users to lean forward. Materials used to promote comfort for individuals maintaining a prone, seated position for extended periods of time have been incorporated to alleviate discomfort and create an environment that enhances the gaming experience.

Convenience features also enhance the enjoyment realized by gaming patrons. For example, stationary footrests, adjustable headrests, and adjustable-height seat cushions allow for players of different sizes and preferences to use and enjoy the same gaming chair. In addition, chair-mounted gaming buttons eliminate the need for players to reach for standard input devices on the cabinet, making the player's gaming experience more convenient and, thus, more enjoyable.

As the complexity and capacity of microcomputer programs continue to grow, the graphics and audio of wagering games have become more realistic and intense. As a result, different accessories have been provided to enhance the game playing experience. Surround-sound speaker systems and high-definition wide-screen displays are just some of the accessories that are available on modern gaming machines to enhance the graphic and acoustic output of wagering games and, thus, increase player enjoyment. However, such accessories have traditionally been housed within the gaming machine cabinet.

Many current gaming machines also fail to add ambiance to a gaming environment, for example, by providing any type of ambient light to further enhance visual effects displayed on a game display. Although some current gaming machines attempt to provide some type of supplemental lighting system, these gaming machines fail to do so without distracting the player. For example, some current gaming machines include add-on elements, e.g., illuminated bezels mounted to the cabinet, that are generally considered distracting and indiscrete to the player. These add-on elements fail to functionally and aesthetically integrate with the gaming cabinet and, therefore, detract from an enhanced game play experience. In addition, such elements fail to extend and emphasize the game experience beyond the traditional electronic display borders. As such, current ambient elements, such as add-on bezels, are obtrusive and unpleasant in character and tend to either distract the player from the gaming event or they disrupt attempts to create a pleasant visual ambience for the player.

SUMMARY

According to one embodiment of the present disclosure, a gaming machine for playing a wagering game is presented. The gaming machine includes one or more displays configured to display the outcomes of the wagering game, and at least one wager input device configured to receive wagers from players for playing the wagering game. The gaming machine also includes a gaming chair with a base, a seat portion attached to the base, at least one speaker assembly, and a backrest. The gaming chair of this embodiment also includes a mounting frame having a polymeric body with one or more contoured faces. The mounting frame is attached to the backrest and the one or more speaker assemblies, the mounting frame coupling both the backrest and the speaker assemblies to the base.

According to another embodiment of the present disclosure, a gaming system is provided for playing one or more wagering games. In this embodiment, the gaming system includes one or more displays for displaying outcomes of the wagering game(s), the outcomes being randomly selected from a plurality of wagering game outcomes. The gaming system also includes at least one player input device configured to receive play input from players, and at least one wager input device for receiving wagers from players for playing the wagering game(s). The gaming system also includes a gaming chair with a base, a seat portion supported on the base, a speaker assembly, and a backrest. The gaming chair also includes an internal mounting frame with a polymeric body comprising a plurality of ribs that define an array of compartments. The internal mounting frame is attached to the backrest and speaker assembly, coupling both the backrest and the speaker assembly to the base.

According to yet another embodiment of the disclosure, a gaming chair for a wagering game machine is presented. The gaming chair of this embodiment includes a base, a seat portion supported by the base, and a mounting frame with a polymeric body having a first contoured face in opposing spaced relation to a second contoured face. A backrest and a speaker assembly are both attached to the mounting frame. The mounting frame, in turn, attaches both the backrest and the speaker assembly to the base.

In accordance with yet another embodiment of the present disclosure, a gaming machine for playing a wagering game is presented. The gaming machine includes one or more displays for displaying randomly selected outcomes of the wagering game, and at least one wager input device for receiving wagers from players. The gaming machine also includes a gaming chair with a seat portion, a backrest, a speaker assembly, and a mounting frame coupled to the seat portion and the speaker assembly. The mounting frame includes at least one curved contoured face to which the backrest is attached.

The above summary is not intended to represent each embodiment, or every aspect, of the present invention. The above features and advantages, and other features and advantages of the present disclosure, will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 9 is a rear-view illustration of the gaming machine chair of FIG. 5 with the boot, shroud, and seat assembly removed;

FIG. 10 is a partially-exploded perspective-view illustration of the rear trim structure of the backrest assembly of the gaming machine chair of FIG. 5; and FIG. 11 is a plan-view illustration of a portion of the backrest assembly rear trim structure of FIG. 10 taken in partial cross-section along line B-B.

Figure 1:
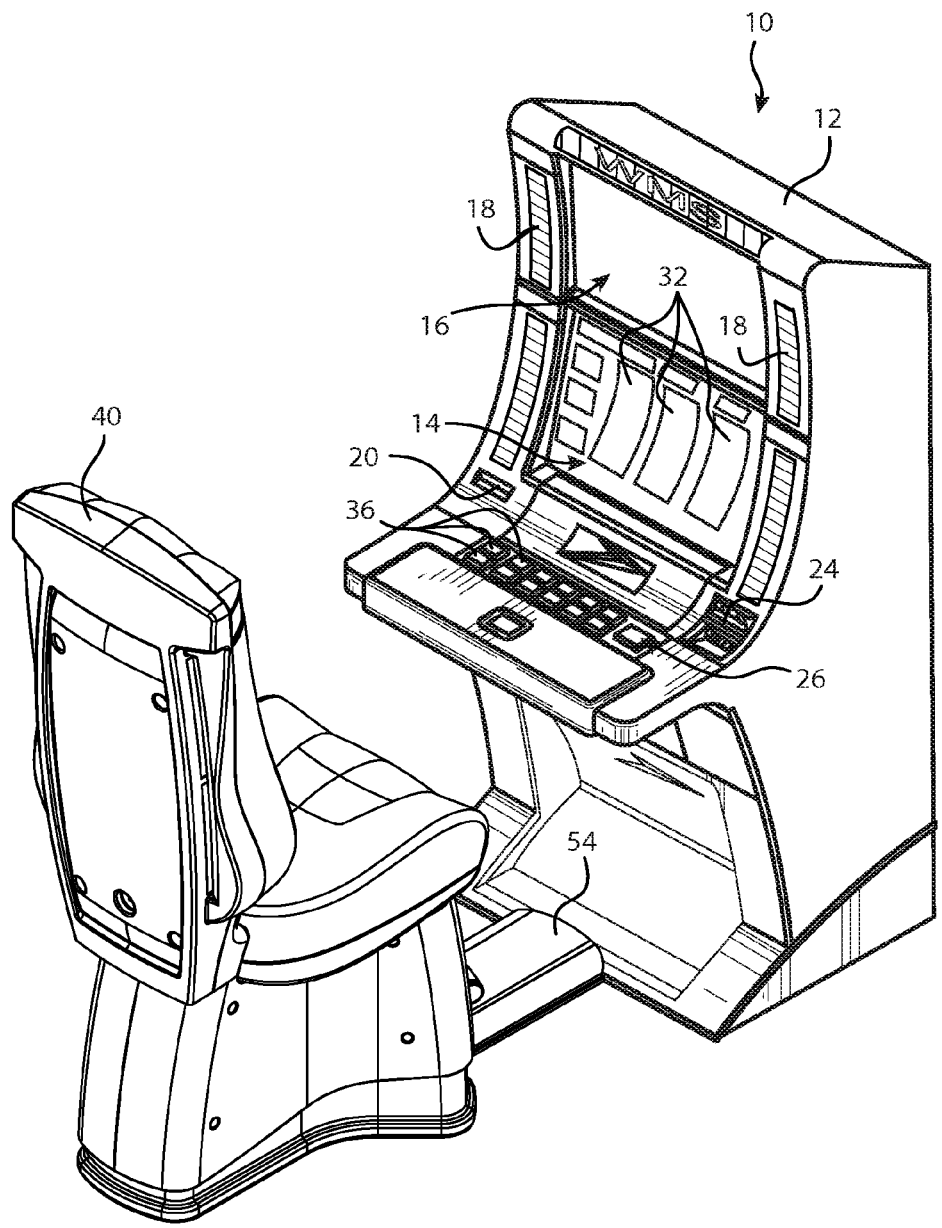
FIG. 1 is a perspective-view illustration of an exemplary gaming machine with a gaming chair in accordance with embodiments of the present disclosure.

While the invention is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there is shown in the drawings and will herein be described in detail representative embodiments of the invention with the understanding that the present disclosure is to be considered as an exemplification of the principles of the disclosure and is not intended to limit the broad aspect of the disclosure to the embodiments illustrated. To that extent, elements and limitations that are disclosed herein, for example, in the Abstract, Summary, and Detailed Description of the Exemplary Embodiments sections, but not explicitly set forth in the claims, should not be incorporated into the claims, singly or collectively, by implication, inference or otherwise.

Referring to FIG. 1, a perspective-view illustration of an exemplary gaming terminal 10 (also referred to herein as "wagering game machine" or "gaming machine") is shown in accordance with one embodiment of the present disclosure. The gaming terminal 10 of FIG. 1 may be used, for example, in traditional gaming establishments, such as casinos, and non-traditional gaming establishments, such as pools, hotels, restaurants, and airports. With regard to the present disclosure, the gaming terminal 10 may be any type of gaming terminal and may have varying structures and methods of operation. For instance, the gaming terminal 10 may be an electromechanical gaming terminal configured, for example, to play mechanical slots, or it may be an electronic gaming terminal configured, for example, to play a video casino game, such as slots, keno, poker, blackjack, roulette, craps, etc. It should be understood that although the gaming terminal 10 is shown as a free-standing gaming terminal of the upright type, the gaming machines of the present disclosure may take on a wide variety of other forms, such as free-standing gaming terminals of the slant-top type, "countertop" gaming devices, hand-held or portable gaming devices, etc. Finally, the drawings presented herein are not to scale and are provided purely for instructional purposes; as such, the individual and relative dimensions shown in the drawings are not to be considered limiting.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor (not shown), one or more information readers 24, one or more player-input devices 26, and one or more player-accessible ports 28 (e.g., an audio output jack for headphones, a video headset jack, a wireless transmitter/receiver, etc., shown in FIG. 2). While these typical components found in the gaming terminal 10 are described below, it should be understood that numerous additional/alternative peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in commonly owned U.S. Pat. No. 6,517,433, to Loose et al., entitled "Reel Spinning Slot Machine with Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10.

Figure 3:
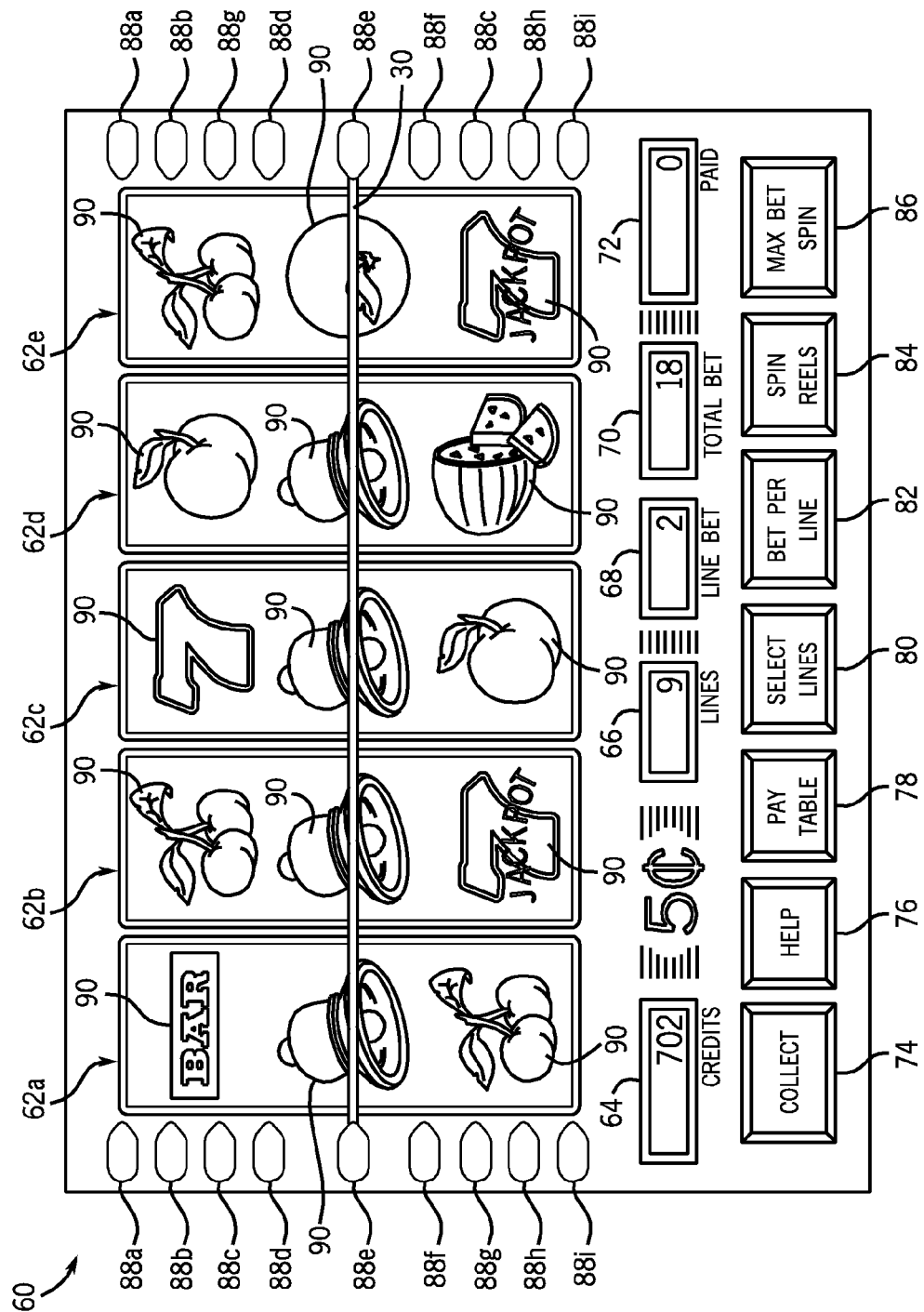
FIG. 3 is a screen shot of a basic-game screen of an exemplary wagering game that may be played on the gaming machine of FIG. 1 and/or gaming system of FIG. 2.

As seen, for example, in FIG. 3, the primary display area 14 may include one or more paylines 30 extending along a portion thereof. In some embodiments, the primary display area 14 comprises a plurality of mechanical reels (shown with hidden lines at 32) and a video display 34 such as a transmissive display (or a reflected image arrangement in other embodiments) in front of the mechanical reels 32. If the wagering game conducted via the gaming terminal 10 relies upon the video display 34 only, and not the mechanical reels 32, the mechanical reels 32 may be removed from the interior of the terminal 10 and the video display 34 may be of a non-transmissive type (featured below in a representative embodiment in FIG. 3). In contrast, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include, for example, a plurality of buttons 36 on a button panel. In addition, or as an alternative thereto, a touch screen may be mounted over the primary display area 14 and/or the secondary display area 16 and having one or more soft touch keys, as exemplified in FIG. 3. The player-input devices 26 may further comprise technologies that do not rely upon touching the gaming terminal, such as speech-recognition technology, movement- and gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed, for example, in U.S. Patent Application Publication No. 2003/0045354, entitled "Portable Data Unit for Communicating with Gaming Machine Over Wireless Link," which is incorporated herein by reference in its entirety. The account may be stored directly on the portable medium, or at an external system 46 (see FIG. 2) as more fully disclosed, for example, in U.S. Pat. No. 6,280,328, to Holch et al., entitled "Cashless Computerized Video Game System and Method," which is incorporated herein by referenced in its entirety. To enhance security, the individual carrying the portable medium may be required to enter a secondary independent authenticator (e.g., password, PIN number, biometric, etc.) to access their account.

FIG. 1 depicts the gaming machine 10 with an attached gaming chair 40. The gaming chair 40 is located in operational proximity of the gaming machine 10. For instance, in the illustrated embodiment of FIG. 1, the gaming chair 40 is mounted to the gaming floor immediately adjacent and in opposing relation to the gaming machine 10. The gaming chair 40 is operable to receive and process signals from the gaming machine 10. In this example, the gaming chair 40 is electrically and mechanically coupled to the gaming machine 10 via a sled 54. Alternatively, the gaming chair 40 may be detachably coupled to the gaming machine 10 or may lack any physical connection with the gaming machine 10. As additional design options, the gaming chair 40 may be operatively coupled to the gaming machine 10 via alternative means, such as a wireless interface (e.g., infrared, radio, laser, or other wireless communication technologies) or other hard line connections (e.g., fiber optic cabling). Also, as described below, the gaming chair 40 may be automated to provide, for example, simulated motions related to events occurring during game play.

Figure 2:
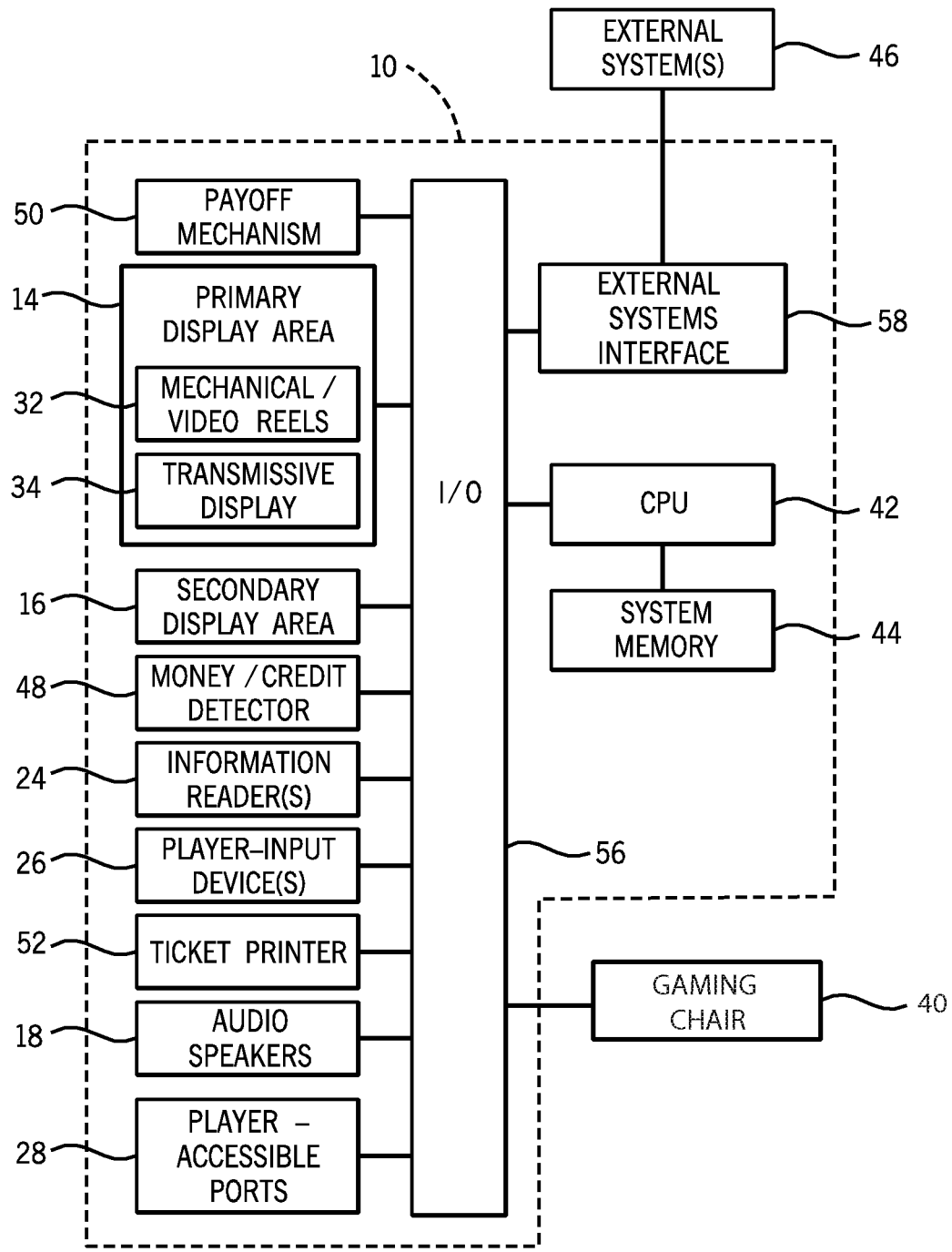
FIG. 2 is a schematic diagram of an exemplary gaming system with a gaming chair in accordance with embodiments of the present disclosure.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device(s). The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and/or multiple program memories. The money/credit detector 48 signals the processor 42 that money and/or credits have been input via a value-input device, such as the bill validator 20 or coin acceptor 22 of FIG. 1, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, the gaming chair 40, and a payoff mechanism 50. The payoff mechanism 50 is operable, for example, in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

In some embodiments, the controller 42 is also connected to, and controls, the gaming chair 40. For example, the controller 42 can regulate the actuation and modulation of one or more actuators (discussed below with respect to FIGS. 6-8) inside the gaming chair 40 to move the chair in correlation with events occurring in the wagering game. Moreover, the controller 42 may be designed to regulate an emotive lighting assembly packaged in the backrest assembly of the gaming chair 40 to create a preferred gaming ambiance and/or a predetermined gaming experience, as discussed below with respect to FIGS. 9-11. To this regard, the audio output of a speaker package in the gaming chair 40 may also be controlled by the controller 42, as discussed below with respect to FIG. 8.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 may be connected to an external system interface 58, which is connected to the external system 46. In this exemplary configuration, the controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

The controller 42 of FIG. 2 comprises any combination of hardware, software, and/or firmware now known or hereinafter developed that may be disposed or reside inside and/or outside of the gaming terminal 10, and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Security features may be advantageously utilized where the gaming machine 10 communicate wirelessly with external systems 46, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entireties.

Referring now to FIG. 3, an image of a basic-game screen 60 adapted to be displayed on the primary display area 14 of FIG. 1 is illustrated, according to one embodiment of the present disclosure. A player begins play of a basic wagering game by providing a wager (e.g., inserting a cash note or substitute currency media into the validator 20, and/or inserting a player-card into information reader 24). A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62a-e. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62a-e; and a "max bet spin" button 86 for wagering a maximum number of credits and moving the reels 62a-e of the basic wagering game. While the gaming terminal 10 allows for these types of player inputs, the present disclosure does not require them and can be used on gaming terminals having more, less, or different player inputs.

Paylines 30 may extend from one of the payline indicators 88a-i on the left side of the basic-game screen 60 to a corresponding one of the payline indicators 88a-i on the right side of the screen 60. A plurality of symbols 90 is displayed on the plurality of reels 62a-e to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation, animation, or other indicia, and may further include a "blank" symbol.

Symbol combinations may be evaluated as line pays or "scatter pays". Line pays may be evaluated left to right, right to left, top to bottom, bottom to top, or any combination thereof by evaluating the number, type, or order of symbols 90 appearing along an activated payline 30. Scatter pays, on the other hand, are evaluated without regard to position or paylines, and only require that such combination appears anywhere on the reels 62a-e. While an embodiment with nine paylines is shown, a wagering game with no paylines, a single payline, or any plurality of paylines will also work with the present disclosure. Additionally, though an embodiment with five reels is shown, a gaming terminal with any plurality of reels may also be used in accordance with the present disclosure.

Figure 4:
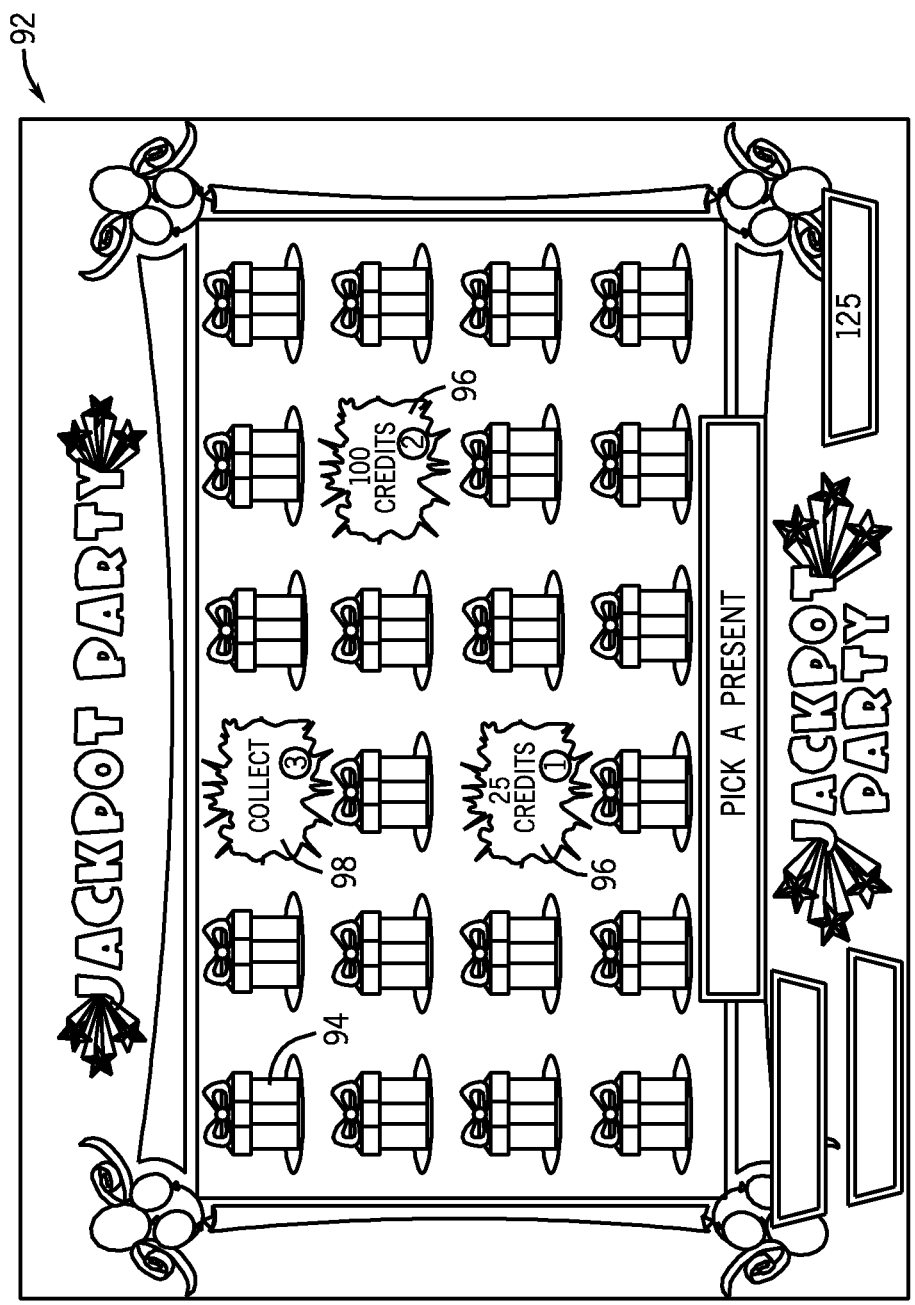
FIG. 4 is a screen shot of a bonus-game screen of an exemplary wagering game that may be played on the gaming machine of FIG. 1 and/or gaming system of FIG. 2.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
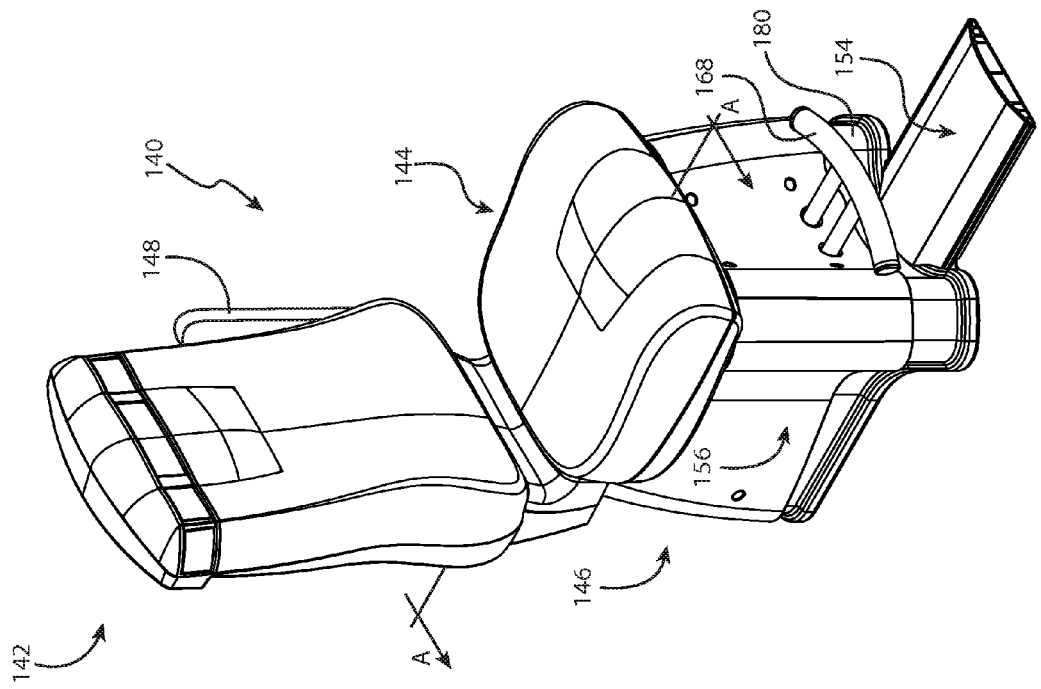
FIG. 5 is a front perspective-view illustration of an exemplary gaming machine chair in accordance with embodiments of the present disclosure.

Referring now to FIG. 5, a perspective-view illustration of a gaming chair, designated generally as 140 (also referred to herein as "gaming machine chair"), for a wagering game system or wagering game machine is presented in accordance with embodiments of the present disclosure. The gaming chair 140 generally includes a backrest assembly (or "seatback") 142 and a seat assembly (or "seat bottom") 144, both of which are functionally supported on a platform assembly, indicated generally at 146 in FIGS. 5 and 6. The seat and backrest portions 142, 144 may be swivel mounted to the platform assembly 146 to ease entry to and alighting from the gaming machine/system. Moreover, the height and angle of the backrest portion 142 and the seat portion 144 may be individually and/or collectively adjustable.

Communication between the gaming chair 140 and a gaming machine, such as gaming terminal 10 of FIG. 1, or gaming system, such as the exemplary gaming system of FIG. 2, may be accomplished in a variety of ways, including wireless transceivers, direct connectivity, or otherwise. Similar to the embodiment of FIG. 1, for example, the gaming chair of FIG. 5 includes a sled 154 with an internal wiring harnesses (not visible in the views provided) that electrically and mechanically couples to the gaming machine or system. The gaming chair 140 may also be operable to receive input from a player through various input devices, such as a button panel, joystick, mouse, or motion sensor(s) (not shown), located, for example, on a pivotable armrest 148 (only one of which is shown in FIG. 5, but an identical counterpart may be pivotably attached to the opposing side of the seatback portion 142). Other features may include, but are not limited to, a ticket printer, a card read/write device, a cup holder, foldout tray, a headphone jack, volume controls, brightness controls, cushion heaters, and a retractable tape for restricting use of the gaming chair 140 and/or corresponding gaming machine/system. Additional gaming chair features and design options are disclosed in commonly-assigned U.S. Patent Application Publication No. 2008/0054561 A1, to Stephen A. Canterbury et al., filed in the U.S. on Sep. 21, 2007 and entitled "Gaming Machine Chair," which is incorporated herein by reference in its entirety.

Figure 6:
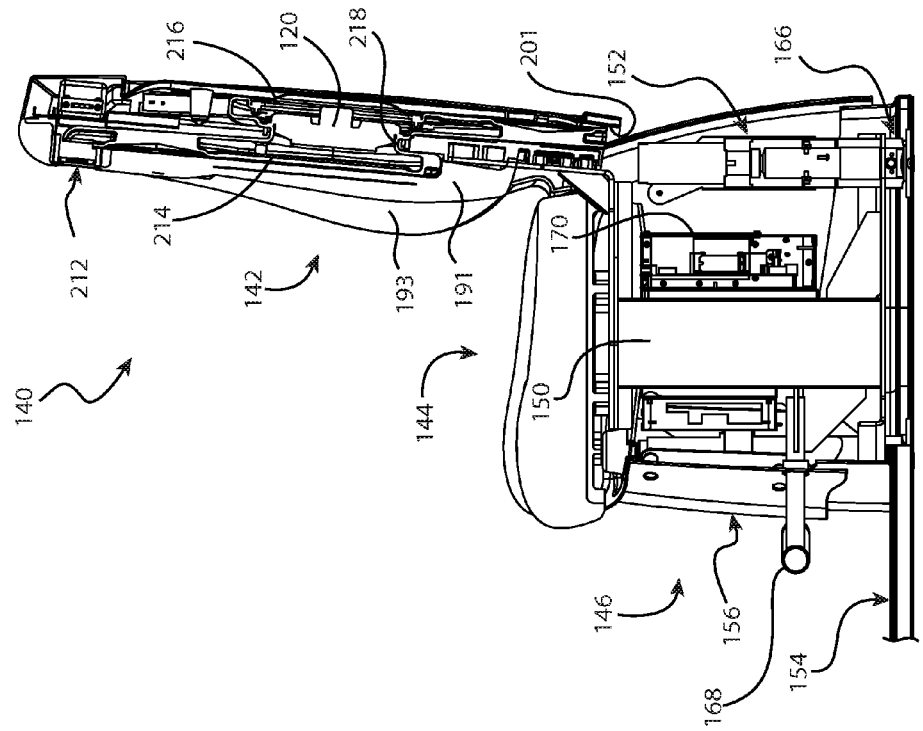
FIG. 6 is a side-view illustration of the gaming machine chair of FIG. 5 taken in partial cross-section along line A-A.
Figure 7:
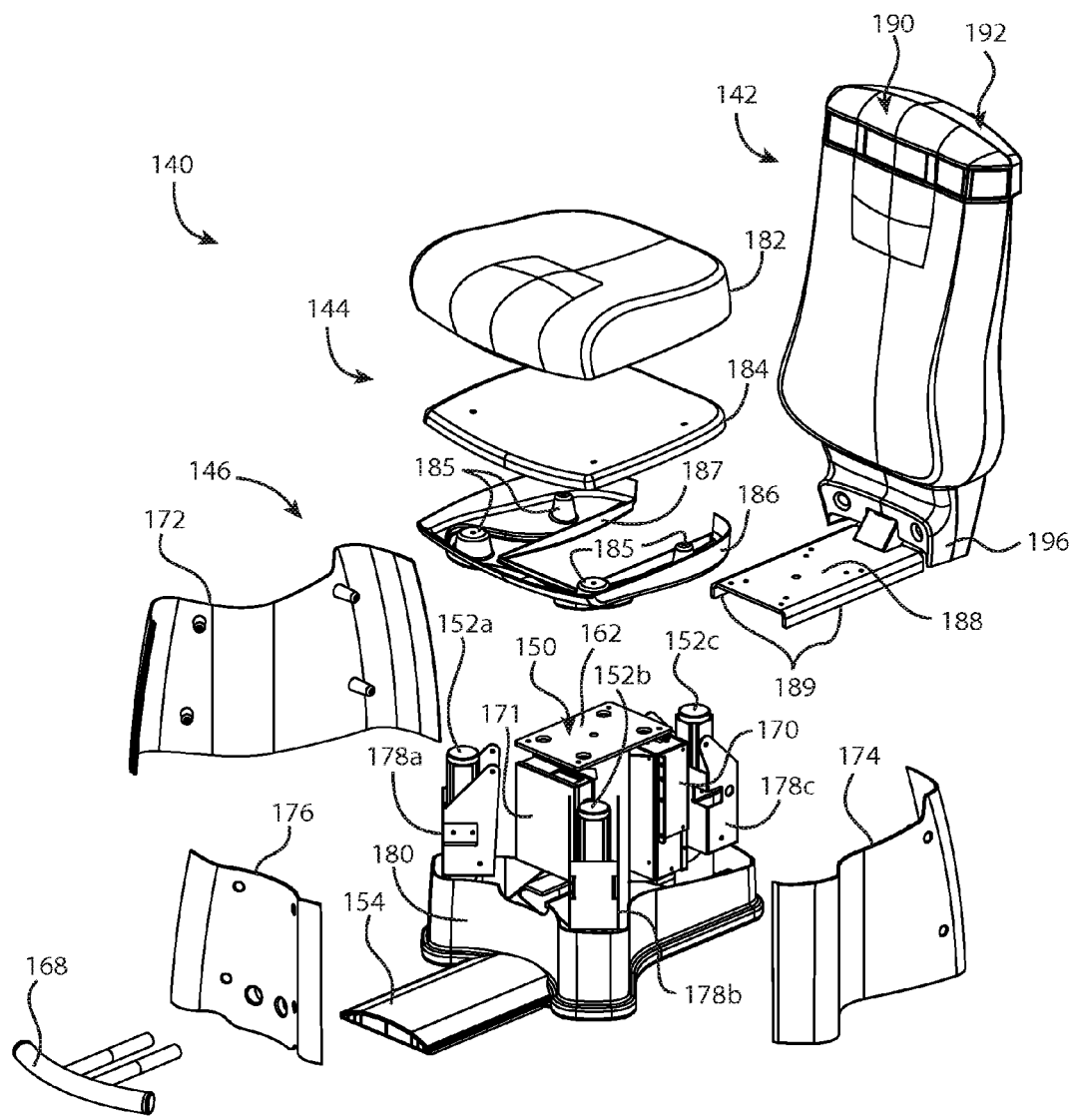
FIG. 7 is a partially-exploded perspective-view illustration of the gaming machine chair of FIG. 5.

Referring now to FIGS. 6 and 7, the platform assembly 146 provides functional and operational support for the backrest and seat assemblies 142, 144. In one exemplary configuration, the platform assembly 146 comprises a base 150, one or more actuators 152, and a movable shroud 156. According to the illustrated embodiment, three actuators 152—e.g., first, second, and third brushless DC motors with ball screws 152a, 152*b* and 152*c*, respectively, are packaged under the seat portion 144. It is contemplated that the gaming chair 140 comprise more or fewer than three actuators, such actuators taking on any of a variety of alternative constructs (e.g., pneumatic cylinders, hydraulic cylinders, electric actuators, electromechanical actuators, smart materials, linear actuators, etc.).

The actuators 152 are operatively attached to and selectively actuable for moving the gaming chair seat and backrest assemblies 142, 144. For example, the actuators 152 may be directly or indirectly coupled to the gaming chair seat assembly 142 and/or the backrest assembly 144, as developed further below. In some embodiments of the present disclosure, the actuators 152 respond to signals received by a motion controller 170 from the gaming machine (e.g., FIG. 1) and/or gaming system (e.g., FIG. 2). Optionally, the actuators 152 may also respond to signals from a button panel, joystick, or other player input device on the gaming chair 140. In the exemplary configuration shown, the actuators 152 expand and contract in a sequence or manner that supports, for example, the desired simulated motion presented during game play or requested by the player. The actuators 152 can provide various types of movement, including, but not limited to, heave (upward and downward movement), pitch (forward and backward tilting), and roll (lateral tilting). Accordingly, the gaming chair 140 shown is operable to provide three degrees of freedom (DOF). While one embodiment offers 3-DOF, additional actuators could be added to provide other movements equating to 4 or more DOF. These other movements may include, for example, surge (rectilinear forward and rearward movement), sway (rectilinear lateral movement), and yaw (rotation about a vertical axis). Alternatively, if fewer actuators are provided, the gaming chair 140 would offer fewer DOF. In the illustrated embodiment, the chair 140 is also operable to provide other tactile motions, such as, but not limited to, vibrations, shaking, pulsations, etc.

The motion controller 170 is manufactured with the appropriate hardware and software to respond to signals from the gaming machine (e.g., CPU 42 of FIG. 2) and/or the gaming system (e.g., external system 46 of FIG. 2) as directed by the gaming software, or to respond to input from the player, and controls automated functions provided by the gaming chair 140. For example, in one embodiment, the motion controller 170 includes a printed circuit board (PCB) with various components, such as a microprocessor. The motion controller 170 is enclosed in a grounded material suitable to shield the motion controller 170 from external interference such as electrostatic, radio frequency, and magnetic energy. The enclosure, as seen in FIGS. 7 and 8, could be a box constructed of, but not limited to, aluminum, copper, zinc plated steel, synthetic and natural polymers, etc.

The base 150, which may also be referred to as "weldment," includes structure for coupling to the various actuators 152. In the illustrated embodiment of FIG. 8, for example, the base 150 comprises three legs, namely first, second and third elongated, U-shaped legs 158*a*, 158*b* and 158*c*, respectively. Each of the legs 158 is designed to attach to a respective one of the actuators 152. By way of example, and not limitation, the legs 158*a*, 158*b*, 158*c* project outward from a first end of an elongated, cylindrical shaft 160. In this example, each leg 158 extends generally orthogonally from the cylindrical shaft 160 such that the legs 158 are disposed in a triangular-arrangement. Each leg 158 has a complementary bore hole (not visible in the views provided) through which a respective actuator passes and locks to the base 150 (e.g., via threaded coupling, fasteners, welding, etc.). Recognizably, the number, shape, dimensions, and orientation of the base legs 158 may be modified, individually or collectively, to accommodate any number or type of actuators. A second end of the shaft 150 has attached thereto a generally-planar platform 162 at which the seat assembly 144 is mounted to the base 150. In some embodiments, the base 150 is fabricated as a single-piece, unitary structure, fabricated, for example, from a metallic material, such as aluminum or steel, a high-strength resin, such as nylon, or a high-strength polymer, such as polyvinyl chloride (PVC), PIPD, or combinations thereof.

Figure 8:
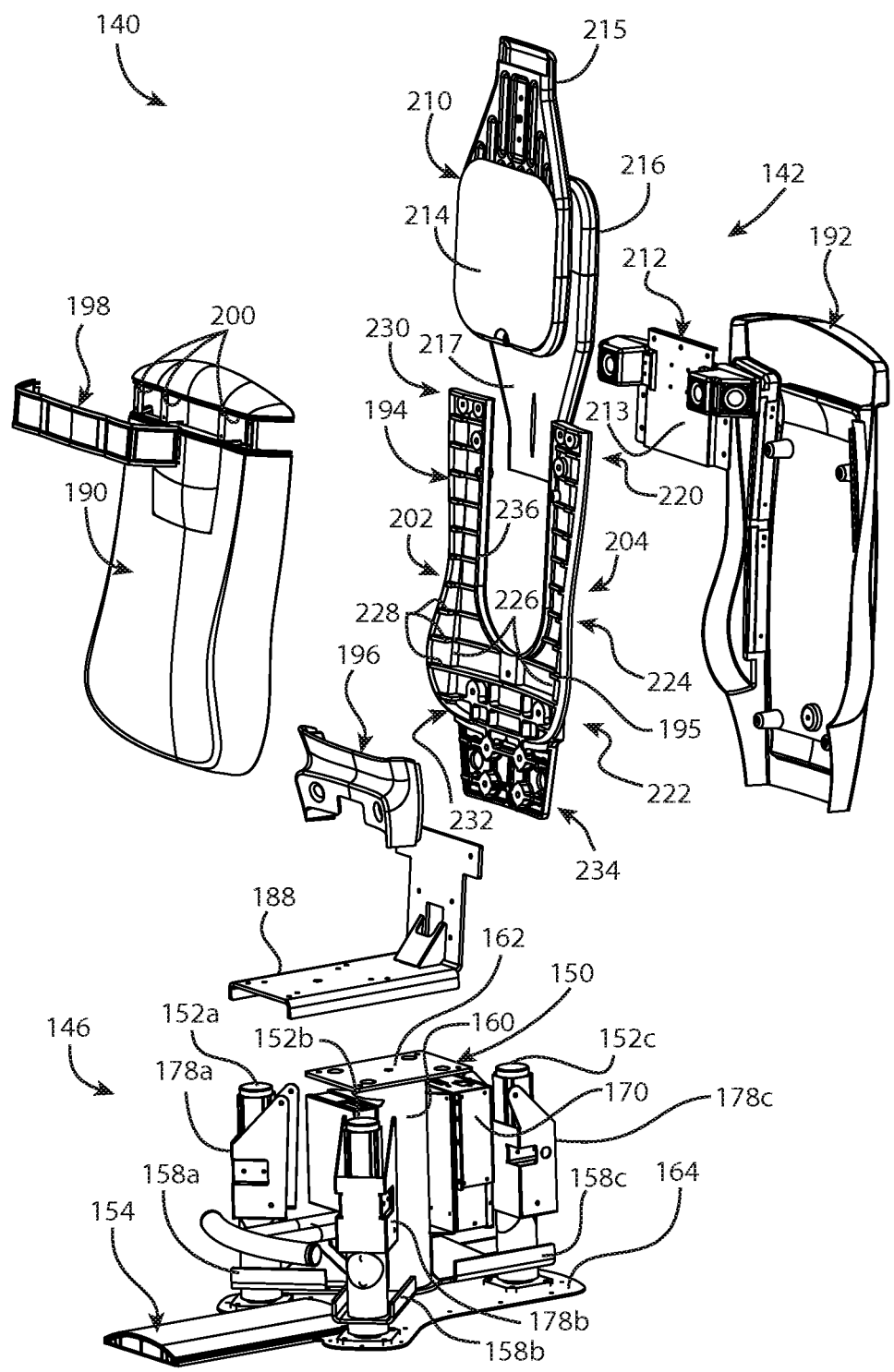
FIG. 8 is an alternative partially-exploded perspective-view illustration of the gaming machine chair of FIG. 5 with the boot, shroud, and seat assembly removed.

The gaming chair 140 of FIGS. 5-8 is fixed to and supported on a base plate 164, as best seen in FIG. 8, which, in turn, may be secured (e.g., via bolts) directly to or laid on the floor or commensurate support structure beneath the gaming chair 140. Alternatively, the base plate 164 may be eliminated from the gaming chair construction, wherein which the gaming chair 140 is permanently or releasably fixed directly to the floor/support structure. In one embodiment, the actuators 152 are coupled directly to the chair's support structure. For instance, each of the actuators 152 is pivotably mounted to the base plate 164 via a ball joint 166 (one of which is visible in FIG. 6). The base 150 is attached, as described above, to the various actuators 152. In this particular arrangement, the base 150 lacks a direct connection to the support structure (e.g., base plate 164); rather, the base 150 is movably attached to the base plate 164 via the actuators 152, as seen in FIGS. 8 and 9. In so doing, the base 150, backrest assembly 142 and seat assembly 144 are effectively suspended or perched on the actuators 152, whereby the base 150, backrest 142 and seat 144 are selectively repositioned (e.g., heaved, pitched, rolled, vibrated, etc.) along any of the three Cartesian coordinate axes by the selective actuation and modulation of one or more of the actuators 152. The actuators 152 therefore act to support the weight of the gaming chair 140 and the player seated thereon, and also automate (e.g., provide dynamic movement) to the gaming chair 140.

A movable shroud 156 inhibits access to the underside area of the gaming chair 140. As indicated above, and illustrated in FIGS. 6 and 7, the actuators 152 and base 150 are positioned underneath the seat assembly 144. The movable shroud 156, as embodied in FIGS. 5 and 6, projects downward from the underside surface of the seat portion 144, extending in a generally continuous manner around the lower periphery of the seat base, thereby inhibiting access to the region below the seat portion 144 at which the base 150 and actuators 152 are located. In addition, a flexible, stationary boot 180 projects upward from the base plate 164, extending in a generally continuous fashion around the lower-most region of the actuators 152 and base 150, as seen in FIG. 7. The moveable shroud 156 and stationary boot 180 cooperate, as illustrated in FIGS. 5 and 6 and described hereinbelow, to conceal and substantially inhibit access to the underside of the seat assembly 144, protecting players and other patrons from the moving actuators 152, base 150, and other potentially-hazardous components of the gaming chair 140 located under the seat assembly 144, and preventing unscrupulous parties from attempting to access the components under the gaming chair seat assembly 144. Recognizably, the relative orientation of the shroud 156 and boot 180 may be switched (i.e., the movable shroud 156 projecting up from the base plate 164 and the stationary boot 180 extending down from the seat assembly) without departing from the intended scope of the present disclosure.

As shown in FIG. 7, the movable shroud 156 includes three separate pieces: a right lateral flank ("first flank") 172, a left lateral flank ("second flank") 174, and a front shield 176. Each of the three constituent parts of the movable shroud 156 is operatively attached to one or more of the actuators 152 for concurrent movement therewith. In particular, with reference to FIG. 7, the first flank 172 is mounted to a first bracket 178a (e.g., via threaded fasteners) that is rigidly coupled to the first actuator 152a, and to a third bracket 178c (e.g., via threaded fasteners) that is rigidly coupled to the third actuator 152c. Likewise, the second flank 174 is mounted to a second bracket 178b (e.g., via threaded fasteners) that is rigidly coupled to the second actuator 152b, and to the third bracket 178c (e.g., via threaded fasteners) that is rigidly coupled to the third actuator 152c. Finally, the front shield 176 is mounted to the first actuator 152a via bracket 178a, and to the second actuator 152b via bracket 178b. In a similar regard, the exemplary platform assembly 146 is also provided with a footrest 168 that is optionally attached to actuators 152 via base 150 for concurrent movement therewith.

Although illustrated as three distinct, disconnected pieces, the movable shroud 156 may comprise any number of constituent parts fewer or greater than three. Moreover, each of the shroud pieces may be operatively attached to a single actuator, every actuator, or any combination in between without departing from the intended scope and spirit of the present disclosure. It is also envisioned that the movable shroud 156 be coupled directly to the base 150 and/or seat assembly 144 so long as movement of the seat assembly 144 is left unimpeded.

Referring to both FIGS. 5 and 7, the moveable shroud 156 and stationary boot 180 cooperate, as briefly described above, to generally conceal and substantially inhibit access to the underside of the seat assembly 144. In one embodiment, the movable shroud 156 is in continuous overlapping engagement with the stationary boot 180, thereby preventing inadvertent insertion of an appendage, extremity, clothing, etc. into the underside compartment of the gaming chair 140 where the moving actuators 152 and base 150 are located. By way of example, the lower portion of the inner surface of the movable shroud 156 (i.e., first flank 172, second flank 174, and front shield 176) overlaps and presses against a corresponding upper portion of the outer surface of the stationary boot 180, as seen in FIG. 5. Alternatively, the lower portion of the outer surface of the movable shroud 156 may overlap and press against a corresponding upper portion of the inner surface of the stationary boot 180. This surface-to-surface engagement extends in a generally continuous manner around the entire upper periphery of the stationary boot 180, as seen in FIG. 5.

The movable shroud 156 is in flexural engagement with the stationary boot 180 to bend the stationary boot 180 during actuation of the actuators 152. By way of explanation, the stationary boot 180 may comprise a flexible material (e.g., an elastomeric thermoplastic polyurethane), whereas the movable shroud 152 is fabricated from a more rigid material (e.g. ABS). Accordingly, when one or more of the actuators 152 are activated (e.g., via motion controller 170), causing the gaming chair 140 to move (e.g., tilt), the movable shroud 156 will exhibit concomitant movement due to the mechanical coupling with the actuators 152 described above. As the movable shroud 156 shifts, the right lateral flank 172, left lateral flank 174, and/or front shield 176 will press inward against a corresponding portion of the boot 180. This flexural engagement minimizes (or perhaps eliminates) gaps between the shroud 156 and boot 180 during movement of the gaming chair, which in turn helps prevent the inadvertent insertion of an appendage or extremity into the underside compartment of the gaming chair 140.

The representative seat portion 144 featured in FIG. 7 is depicted as a three-part assembly, comprising an upper seat cushion 182, an intermediate substrate 184, and a lower trim shell 186. In one embodiment, the upper seat cushion 182 comes preassembled with the intermediate substrate 184. For example, the upper seat cushion 182 is placed on top of the substrate 184, and a cushion cover (not shown) is wrapped around the upper seat cushion 182, over the sides of the substrate 184, and stapled to the underside of the substrate 184. It is also contemplated that the lower trim shell 186 come preassembled with the cushion 182 and/or substrate 184 prior to integration of the seat assembly 144 with the gaming chair 140.

To assemble the seat assembly 144 with the remainder of the gaming chair 140, the L-shaped bracket 188 is first mounted to the platform 162 of the base 150 (e.g., via screws). Thereafter, or contemporaneously therewith, the intermediate substrate 184 is coupled to the upper surface of the L-shaped bracket 188. By way of example, and not limitation, screws (not shown) are passed vertically-upward (with respect to FIG. 8) through bore holes in the L-shaped bracket 188, and received in complementary bosses (not visible in the view provided) integral with an underside surface of the intermediate substrate 184. Once the intermediate substrate 184 is properly secured to the platform 162, the seat cushion 182 is coupled to an upper surface of the substrate 184 (unless the cushion 182 and substrate 186 come preassembled as described above), whereas the lower trim shell 186 is coupled to a lower surface of the substrate 184 in opposing spaced-relation to the seat cushion 182. In the illustrated embodiment, the trim shell 186 includes a channel 187 that is sufficiently wide and long to receive therebetween the platform 162 of the base 150 and the downwardly-projecting flanges 189 of the L-shaped bracket 188. The lower trim shell 186 is oriented such that channel 187 partially surrounds the platform 162 and L-shaped bracket 188. The shell 186 is then mechanically coupled to the intermediate substrate 184, for example, via threaded fasteners (not shown), each of which is fed through a respective cup 185 of the lower trim shell 186, passed through one of the four holes in the substrate 184, and is received in a complementary boss (not visible in the view provided) integral with a lower surface of the upper seat cushion 182.

FIG. 8 of the drawings provides a partially-exploded perspective-view illustration of the gaming machine chair 140, depicting the various constituent parts of an exemplary backrest assembly 142 in accordance with the embodiments of the present disclosure. In particular, the exemplary backrest assembly 142 of FIG. 8 includes a backrest or back support 190, a rear trim structure 192, an internal mounting frame 194, a lower trim piece 196 and a speaker package (which is discussed more extensively below). As seen, for example, in FIG. 6, the backrest 190 may comprise an inner cushion 191, such as low-density foam, that is faced with a functional cover 193, such as cloth, leather, a synthetic draping, etc. A speaker grille 198 (FIG. 8) extends across and covers a pair of speaker ports 200 formed in an upper, headrest portion of the backrest 190. The ports 200 allow air and sound to pass through the backrest assembly 142, for example, to a patron seated in the gaming chair 140. A corresponding rear port 201 (visible in FIG. 6) is formed between the rear trim structure 192 and internal mounting frame 194. The rear port 201 equalizes the air pressure of each side of the speaker assembly.

The gaming chair 140 further includes a speaker package that is integrated into the chair backrest assembly 142. In the embodiment illustrated in FIG. 8, for example, the speaker package comprises a bass transducer 210 and a high- and mid-range speaker set 212. Optionally, the speaker package may comprise additional or alternative components, such as a subwoofer or other speaker type. The speaker package (i.e., bass transducer 210 and speaker set 212) is in signaling communication with the gaming machine (e.g., FIG. 1) and/or gaming system (e.g., FIG. 2) to receive command signals therefrom. For example, electrical cabling may be routed from the speaker package inside the backrest assembly 142, down through the L-shaped bracket 188 into the compartment under the seat assembly 144, around the base 150 to the sled 154. The gaming machine (e.g., FIG. 1) and/or gaming system (e.g., FIG. 2) includes hardware and software to produce sound signals which are delivered to the speaker package. The speaker package is generally employed to provide sound effects, game noises, and other acoustic effects for the gaming machine/system. Additional information regarding speaker systems for gaming devices and gaming chairs is disclosed in commonly-assigned U.S. Patent Application Publication No. 2008/0211276 A1, to James M. Rasmussen, filed in the U.S. on Dec. 19, 2007 and entitled "Speaker System for a Gaming Machine," which is incorporated herein by reference in its entirety.

With continuing reference to FIG. 8, the bass transducer 210 includes a front shell 214 and a back shell 216 that are interconnected via a central cylindrical connector 218 (visible in FIG. 6). Cylindrical connector 218 includes a mounting area, such as a speaker cavity, for stowing a speaker 220 inside the bass transducer 210. The front shell 214 includes a planar, generally square-shaped body with an attachment wall 215 projecting generally-vertically upward from an upper end thereof. The back shell 216 is a substantially similar structure and shape relative to the front 214. That is, back shell 216 includes a planar, generally square-shaped body with an attachment wall 217 projecting generally-vertically downward from a lower end thereof. The front and back shells 214, 216 may therefore be considered mirror images of each other. As seen in FIG. 8, for example, the planar bodies of the front and back shells 214, 216 mount to the cylindrical connector 218 such that the attachment walls 215, 217 point in opposite directions. In this example, the front shell 214, back shell 216 and central connector 218 are an integral unit, molded, for example, from a plastic. As described below, the entire speaker package—i.e., bass transducer 210 and speaker set 212, is packaged or "sandwiched" between the backrest 190 and rear trim structure 192.

The representative internal mounting frame 194 featured in the drawings has a polymeric wishbone-shaped body 195 with a forward contoured-face 202 in opposing spaced relation to a rearward contoured-face 204. In the example provided, the thickness and width of the mounting frame 194 varies almost continuously as you traverse the lateral and longitudinal expanse of the polymeric body 195. For instance, an upper-end region 220 of the mounting frame 194 has a first width and a first thickness, whereas a lower-end region 222 of the mounting frame 194 has a second width and a second thickness that is greater than the width and thickness, respectively, of the upper-end region 220. To this regard, an intermediate region 224 of the mounting frame 194, which is located between the upper- and lower-end regions 220, 222, has a third width and a third thickness that is less than the width and thickness, respectively, of both the upper- and lower-end regions 220, 222.

Likewise, the upper-end region 220 can be seen with a first contoured shape in FIG. 8, whereas the lower-end region 222 of the mounting frame 194 has a second contoured shape that is different from the contoured shape of the upper-end region 220. By way of clarification, the first contoured shape of the upper-end region 220 can be seen with a first curvilinear profile having a first set of dimensions, whereas the second contoured shape of the lower-end region 222 comprises a second curvilinear profile having a second set of dimensions that is different from the dimensions of the first curvilinear profile. The contoured shape of the internal mounting frame 194 provides better, more evenly distributed support for the chair backrest 190 due to the complementary curvature. This additional support translates to the players, helping to maintain the players in the gaming chair 140 when it is moving, as described above.

According to some embodiments of the present disclosure, the polymeric wishbone-shaped body 195 has a "honeycombed" infrastructure. That is, the mounting frame body 195 includes an array of internal ribs or dividers that interconnect to collectively define a number of internal compartments. By way of example, a set of vertically-oriented ribs, designated as 226 in FIG. 8, are generally orthogonally oriented with respect to and intersect a set of horizontally-oriented ribs, designated as 228, to collectively define a plurality of generally square-shaped compartments. As can also be seen in FIG. 8, the vertically- and horizontally-oriented ribs 226, 228 each have a variable-thickness such that the forward most edges thereof cooperatively define the forward contoured face 202.

The internal mounting frame 194 is the primary means for supporting and attaching the entire backrest assembly 142 to the platform assembly 146. That is, the backrest 190, rear trim structure 192, lower trim piece 196, and speaker package are all attached to the internal mounting frame 194, which in turn is attached to the platform assembly 146 via the L-shaped bracket 188. The internal mounting frame 194 has a plurality of fastening regions for coupling to the aforementioned components. In some embodiments, each of the fastening regions lies in a respective plane that is different from the other fastening regions. For instance, the mounting frame 194 shown in FIG. 8 has three separate fastening regions—first, second and third fastening regions 230, 232 and 234, respectively, that are integrally formed with the mounting frame body 195. In this example, the first fastening region 230 lies in a first plane; the second fastening region 232 lies in a second plane that is generally parallel to, but offset from the first plane; and the third fastening region 234 lies in a third plane that is generally parallel to, but offset from both the first and second planes. Optionally, the first, second and third planes may be angularly offset from one another.

Additional design features are enabled by the mounting frame 194 of the present disclosure. These optional design features include, but are not limited to, angled alignment features which optimize assembling of the backrest assembly 142 by making the stacking of components and/or the alignment of fastener holes quicker and easier and, thus, more efficient. One such alignment feature includes the integrally-formed, angled aligning surfaces shown in FIG. 8. When the L-shaped bracket 188 is assembled with the mounting frame 194, these angled aligning surfaces mate with and properly orient the L-shaped bracket 188 as it is being stacked on the mounting frame 194, as well as align the fasteners holes in the bracket 188 with the corresponding holes in the mounting frame 194.

The backrest 190, rear trim structure 192, lower trim piece 196, and speaker package are mechanically fastened (e.g., via threaded fasteners) to one or more of the fastening regions of the internal mounting frame 194. In particular, the internal mounting frame 194 defines an elongated slot 236 that is configured to receive the bass transducer 210 such that the transducer 210 seats within the elongated slot 236, and may thereafter be fixed or otherwise coupled to the mounting frame body 195. As seen in FIG. 8, for example, the elongated slot 236 is generally U-shaped, with a semi-circular base having a pair of upwardly and outwardly sloping side walls. The cylindrical connector 218 of the bass transducer 210 provides a complementary mating surface that is received in the U-shaped slot 236. For example, the outer diameter of the cylindrical connector 218 is approximately equal to but slightly less than the lateral width of the U-shaped slot 236 such that the connecter 218 may be inserted into the elongated slot 236 at an upper end of the mounting frame 194, with respect to FIG. 8, and slid downward until the cylindrical connector 218 is seated in and supported on the semi-circular base of the slot 236.

The bass transducer 210 is thereafter coupled to the rearward contoured-face 204 via a threaded fastener received through complementary aligning holes in the downwardly-projecting attachment wall 217 and lower-end region 222. Likewise, the speaker set 212 is then fastened to the rearward contoured-face 204 of the internal mounting frame 194 and the upwardly-projecting attachment wall 215 of the bass transducer 210—e.g., via threaded fasteners received through complementary, aligning holes in the attachment plate 213 and upper-end region 220 of the mounting frame 194. In a similar or alternative fashion, the backrest 190 is then mechanically coupled to the forward contoured-face 202 and the rear trim structure 192 is mechanically coupled to the rearward contoured-face 204 of the mounting frame 194 such that the internal mounting frame 194 and speaker package are sandwiched or enclosed between the backrest 190 and rear trim structure 192.

Turning now to FIG. 9, the gaming chair 140 further includes a plurality of emotive lighting areas 240 and 242, which are positioned remote from the gaming machine and gaming system. The emotive lighting areas 240, 242 are incorporated into to the gaming chair 140 to enhance the overall gaming environment and to attract new players. For example, the emotive lighting can be used to attract players to the gaming machine (e.g., gaming terminal 10 of FIG. 1) from a distance with colored light shows (including, e.g., coordination of light shows across banks of games). The emotive lighting areas 240, 242 can also be used, for example, to heighten anticipation during game play by using colors and synchronous lighting displays for conveying emotion and drama, and to celebrate wins during a bonus round or during/after an award.

Emotive lighting areas 240 and 242 can include various types of emotive lighting—a diffuse (and indirect) lighting area and a transparent chrome lighting area. Diffuse lighting areas generally include the actual surface of the gaming chair to diffuse and/or reflect lighting indirectly. Actual light sources are hidden within the gaming chair and light only becomes visible when the light sources are activated. To create a more stunning effect, a low reflective metallic finish (such as satin chrome) may be applied to the diffusing surface.

The transparent chrome lighting area incorporates, for example, a two-way mirror effect. For instance, a semi-transparent reflective member (e.g., a ¾ mirror) shields or covers an interior light source located inside the gaming chair. The semi-transparent member reflects all ambient light when the covered interior is dark. However, when the interior light source is activated, the lighting becomes visible and the semi-transparent reflective member virtually disappears.

In the illustrated embodiment, the emotive lighting assembly comprises two diffuse lighting areas: a left diffuse lighting area 240 and a right diffuse lighting area 242. Each diffuse lighting area 240, 242 is generally vertically oriented on a respective lateral side of the gaming chair backrest assembly 142. When the emotive lighting assembly is not activated, the emotive lighting areas 240, 242 appear integral with and as part of the gaming chair 140. When the emotive lighting assembly is activated, the emotive lighting areas 240, 242 enhance the visual ambience of the gaming environment while still retaining the overall aesthetic integrity of the gaming chair 140.

Referring to FIGS. 10 and 11, each of the emotive lighting areas 240, 242 is illuminated via a light source 244, such as an RGB light-emitting diode (LED) array board 244 having a plurality of LEDs. In the illustrated embodiment, each light source 24 is housed inside and hidden by the gaming chair backrest portion 140, between the rear trim structure 192 and internal mounting frame 194. An optional transparent lens 246 (FIGS. 10 and 11) separates the inside of the gaming chair backrest assembly 142, whereat the light source 244 is housed, from a reflective surface 248 oriented along an outer, generally rearward-facing surface of the rear trim structure 192. The transparent lens 248 can be made, at least in part, from any transparent or semi-transparent material. For example, the transparent lens 248 can be made from a polycarbonate (PC) material. The reflective surface 248 is generally a highly reflective material. (e.g., the reflective surface including a mirror quality coating).

As seen in FIG. 11, the light source 244 emits light in a first direction, illustrated with horizontal, leftward-pointing arrows in FIG. 11, through the rear trim structure 192 via lens 246, to the reflective surface 248. The reflective surface 248, in turn, redirects light in a second direction, illustrated with vertical, upward-pointing arrows in FIG. 11, which is away from the player position—i.e., seated in the gaming chair 140 facing the gaming machine displays (e.g., displays 14 and 16 of FIG. 1). As such, the various emotive lighting assemblies are attached to the gaming chair backrest portion 142 such that the light source 244, lens 246 and reflective surface 248 produce lighting that is not viewable from the player position. Alternatively, the lighting could be at the edges of the chair backrest so players see it over his/her shoulder. Additional emotive lighting assemblies could also be integrated into the gaming machine—e.g., along the sides of displays 14 and 16 of FIG. 1. In this instance, the lighting on the gaming chair 140 and the lighting on the gaming machine 10 could be coordinated together, as well as with the events in the base and bonus wagering games (e.g., FIGS. 3 and 4), for further enhancements to the gaming environment and game play experience. Additional information regarding emotive lighting and various optional emotive lighting designs and features are presented in commonly-assigned U.S. Provisional Patent Application No. 61/107,083, to Paul M. Lesley et al., filed on Oct. 21, 2008 and entitled "Game Machine with Improved Lighting Arrangement," which is incorporated herein by reference in its entirety.

While the best modes for carrying out the present invention have been described in detail, those familiar with the art to which this invention relates will recognize various alternative designs and embodiments for practicing the invention within the scope of the appended claims.

The invention claimed is:

1. A gaming system for playing a wagering game, the gaming system comprising:
  at least one display configured to display outcomes of the wagering game;
  at least one input device configured to receive wagers from players; and
  a gaming chair, including:
    a base;
    a seat portion attached to the base;
    at least one speaker assembly;

a backrest; and a mounting frame having a polymeric body with opposing front and rear faces, the front face including a plurality of regions each with a distinct forward-projecting curvilinear profile having a distinct set of dimensions, the mounting frame being attached to the backrest and the at least one speaker assembly, the mounting frame operatively attaching both the backrest and the at least one speaker assembly to the base.

2. The gaming system of claim 1, wherein the plurality of regions includes a first region with a first width and thickness and a second region with a second width and thickness greater than the first width and thickness.

3. The gaming system of claim 1, wherein the plurality of regions includes a first fastening region with a first contoured shape and a second fastening region with a second contoured shape different from the first contoured shape.

4. The gaming system of claim 3, wherein the first fastening region comprises fastening structure to which is attached the backrest, and the second fastening region comprises fastening structure to which is attached the at least one speaker assembly.

5. The gaming system of claim 1, wherein the plurality of regions includes first and second fastening regions integrally formed with the mounting frame body, the first fastening region lying in a first plane and the second fastening region lying in a second plane different from the first plane.

6. The gaming system of claim 5, wherein the first plane is angularly offset from the second plane.

7. The gaming system of claim 1, wherein the mounting frame body comprises a first plurality of ribs connected to and generally transverse with a second plurality of ribs to collectively define a plurality of compartments.

8. The gaming system of claim 1, wherein the mounting frame body comprises a plurality of variable-thickness ribs cooperatively defining at least one of the forward-projecting curvilinear profiles.

9. The gaming system of claim 1, wherein the mounting frame defines a slot, and the at least one speaker assembly includes a mating surface complementary with the slot such that the mating surface is slidably received in the slot and the at least one speaker assembly seats within the slot and couples to the mounting frame.

10. The gaming system of claim 9, wherein the at least one speaker assembly includes a first shell member attached to a second shell member via a central connector, the central connector providing the complementary mating surface.

11. The gaming system of claim 1, wherein the gaming chair further comprises a rear trim, the backrest being attached to the front face of the mounting frame and the rear trim being attached to the rear face of the mounting frame, the mounting frame and the at least one speaker assembly being sandwiched between the backrest and the rear trim.

12. The gaming system of claim 1, further comprising:
at least one lighting assembly including a light source and a reflective surface, the at least one lighting assembly being attached to a rear trim of the gaming chair such that the light source and the reflective surface are not viewable by a player from a player position seated in the gaming chair.

13. The gaming system of claim 12, wherein the light source is concealed by the rear trim of the gaming chair, the light source emitting light in a first direction through a lens in the rear trim to the reflective surface, and the reflective surface redirecting light in a second direction away from the player position.

14. A gaming system for playing at least one wagering game, the gaming system comprising:
at least one display configured to display an outcome of the at least one wagering game, the outcome being randomly selected from a plurality of wagering game outcomes;
at least one wager input device configured to receive a wager from a player to play the at least one wagering game;
at least one player input device configured to receive play input from the player; and
a gaming chair including a base, a seat portion supported on the base, a speaker assembly, a backrest, and an internal mounting frame supported on the base and having a plurality of ribs defining a plurality of compartments, the mounting frame having opposing front and rear faces, the front face including a plurality of regions each with a distinct forward-projecting curvilinear profile having distinct dimensions, the internal mounting frame being attached to and supporting both the backrest and the speaker assembly.

15. The gaming system of claim 14, wherein the plurality of regions includes an upper region with a first front-to-back thickness, a lower region with a second front-to-back thickness greater than the first thickness, and an intermediate region between the upper and lower regions, the intermediate region having a third front-to-back thickness less than both the first and second front-to-back thicknesses.

16. The gaming system of claim 14, wherein the plurality of regions includes first and second fastening regions integrally formed with the mounting frame, each of the fastening regions lying in a respective plane divergent from the other fastening regions.

17. The gaming system of claim 14, wherein the internal mounting frame defines an elongated slot configured to slidably receive the speaker assembly, the speaker assembly being seated within the elongated slot and fixed to the mounting frame.

18. The gaming system of claim 17, wherein the elongated slot is generally U-shaped, the speaker assembly including a first shell member attached to a second shell member via a central cylindrical connector, the central cylindrical connector being received in the U-shaped slot and having an outer diameter approximately equal to the lateral width of the U-shaped slot.

19. The gaming system of claim 14, further comprising:
at least one lighting assembly including a light source and a reflective surface, wherein the light source is housed between the mounting frame and a rear trim of the gaming chair, the light source emitting light in a first direction through the rear trim to the reflective surface, the reflective surface redirecting light in a second direction away from a player position.

20. The gaming system of claim 19, wherein the at least one lighting assembly is attached to the rear trim of the gaming chair such that the light source and the reflective surface are not visible from the player position.

21. A gaming chair for a wagering game system or machine, the gaming chair comprising:
a base;
a seat portion supported by the base;
a mounting frame with a body having a front contoured face in opposing spaced relation to a back contoured face, the front contoured face including a plurality of fastening regions each with a distinct forward-projecting curvilinear profile having a distinct set of dimensions;

a backrest attached to the mounting frame; and
a speaker assembly attached to the mounting frame,
wherein the mounting frame operatively attaches the backrest and the speaker assembly to the base.

22. The gaming chair of claim 21, further comprising at least one of a wiring harness and a wireless interface operatively coupling the gaming chair to the wagering game system or machine.

23. A gaming system for playing a wagering game, the gaming system comprising:
at least one display for displaying randomly selected outcomes of the wagering game;
at least one input device for receiving wagers from players; and
a gaming chair including a seat portion, a backrest, a speaker assembly, and a mounting frame coupled to the seat portion and the speaker assembly, the mounting frame including front and rear faces, the front face including a plurality of fastening regions each with a distinct forward-projecting curvilinear profile having distinct dimensions, the backrest being attached to a first of the fastening regions and the speaker assembly being attached to a second of the fastening regions.

24. The gaming system of claim 23, wherein the mounting frame has a slot providing a U-shape to the mounting frame, the speaker assembly being positioned within the slot.

25. The gaming system of claim 23, wherein the first fastening region has first mounting surfaces for receiving fasteners coupling the backrest to the mounting frame, the second fastening region having second mounting surfaces for receiving fasteners coupling the speaker assembly to the mounting frame, the first mounting surfaces being on a different plane than the second mounting surfaces.

26. The gaming system of claim 23, wherein the forward-projecting curvilinear profiles are defined by end portions of a plurality of structural ribs on the mounting frame.

27. The gaming system of claim 23, wherein the gaming chair further includes at least one actuator providing movement to the chair, the forward-projecting curvilinear profiles of the mounting frame helping to maintain a player's position on the gaming chair when the gaming chair is moving.

* * * * *